United States Patent
Dawson et al.

(10) Patent No.: US 6,793,018 B2
(45) Date of Patent: Sep. 21, 2004

(54) FRACTURING USING GEL WITH ESTER DELAYED BREAKING

(75) Inventors: Jeffrey C. Dawson, Spring, TX (US); Hoang Van Le, Spring, TX (US)

(73) Assignee: BJ Services Company, Houston, TX (US)

(*) Notice: Subject to any disclaimer, the term of this patent is extended or adjusted under 35 U.S.C. 154(b) by 122 days.

(21) Appl. No.: 10/041,511

(22) Filed: Jan. 8, 2002

(65) Prior Publication Data

US 2002/0125012 A1 Sep. 12, 2002

Related U.S. Application Data (60) Provisional application No. 60/260,442, filed on Jan. 9, 2001.

(51) Int. Cl.[7] .............................................. E21B 43/26
(52) U.S. Cl. ........................ 166/300; 166/308; 507/211
(58) Field of Search ................................ 166/300, 308; 507/211, 225, 226, 267, 273

(56) References Cited

U.S. PATENT DOCUMENTS

| | | | |
|---|---|---|---|
| 3,163,219 A | 12/1964 | Wyant et al. ................. 166/42 |
| 3,933,205 A | 1/1976 | Kiel ........................... 166/308 |
| 3,960,736 A | 6/1976 | Free et al. ............. 252/8.55 R |
| 3,965,982 A | 6/1976 | Medlin ........................ 166/249 |
| 3,990,978 A | 11/1976 | Hill ........................ 252/8.55 R |
| 4,007,792 A | 2/1977 | Meister ....................... 166/308 |
| 4,010,253 A | * 3/1977 | Reese et al. ................... 424/47 |
| 4,067,389 A | 1/1978 | Savins ........................ 166/246 |
| 4,378,845 A | 4/1983 | Medlin et al. ............. 166/297 |
| 4,479,041 A | 10/1984 | Fenwick et al. .......... 200/81 R |
| 4,506,734 A | 3/1985 | Nolte .......................... 166/308 |
| 4,514,309 A | 4/1985 | Wadhwa ................. 252/8.55 R |
| 4,541,935 A | 9/1985 | Constien et al. ........ 252/8.55 R |
| 4,549,608 A | 10/1985 | Stowe et al. ................. 166/280 |
| 4,623,021 A | 11/1986 | Stowe ......................... 166/250 |
| 4,657,081 A | 4/1987 | Hodge ......................... 166/308 |
| 4,660,643 A | 4/1987 | Perkins ....................... 166/283 |
| 4,705,113 A | 11/1987 | Perkins ....................... 166/302 |
| 4,714,115 A | 12/1987 | Uhri ........................... 166/308 |
| 4,718,490 A | 1/1988 | Uhri ........................... 166/281 |
| 4,724,905 A | 2/1988 | Uhri ........................... 166/250 |
| 4,739,834 A | 4/1988 | Peiffer et al. ............... 166/308 |

(List continued on next page.)

OTHER PUBLICATIONS

PCT Search Report dated Jun. 21, 2002 for PCT/US 02/00676.
PCT Written Opinion dated Dec. 12, 2002.

*Primary Examiner*—John Kreck
(74) *Attorney, Agent, or Firm*—Howrey Simon Arnold & White, LLP (57) ABSTRACT

A well treatment fluid composition comprises a solvent (such as water), a polymer soluble or hydratable in the solvent, a crosslinking agent, an inorganic breaking agent, and an ester compound. Preferably, the hydratable polymer is a polysaccharide, such as galactomannan, cellulose, or derivatives thereof. The crosslinking agent is preferably a borate, titanate, or zirconium-containing compound. The inorganic breaking agent is preferably a metal-based oxidizing agent, such as an alkaline earth metal or transition metal-based oxidizing agent. The ester compound is preferably an ester of polycarboxylic acid, such as an ester of oxalate, citrate, or ethylenediamine tetraacetate. One example of a suitable ester compound is acetyl triethyl citrate.

11 Claims, 1 Drawing Sheet

Figure 1

U.S. PATENT DOCUMENTS

| Patent No. | | Date | Inventor | Class |
|---|---|---|---|---|
| 4,741,401 | A | 5/1988 | Walles et al. | 166/300 |
| 4,779,680 | A | 10/1988 | Sydansk | 166/300 |
| 4,795,574 | A | 1/1989 | Syrinek et al. | 252/8.551 |
| 4,817,717 | A | 4/1989 | Jennings, Jr. et al. | 166/278 |
| 4,830,106 | A | 5/1989 | Uhri | 166/250 |
| 4,846,277 | A | 7/1989 | Khalil et al. | 166/280 |
| 4,848,468 | A | 7/1989 | Hazlett et al. | 166/300 |
| 4,852,650 | A | 8/1989 | Jennings et al. | 166/250 |
| 4,869,322 | A | 9/1989 | Vogt, Jr. et al. | 166/280 |
| 4,892,147 | A | 1/1990 | Jennings, Jr. et al. | 166/280 |
| 4,926,940 | A | 5/1990 | Stromswold | 166/247 |
| 4,938,286 | A | 7/1990 | Jennings, Jr. | 166/280 |
| 5,005,645 | A | 4/1991 | Jennings, Jr. et al. | 166/280 |
| 5,024,276 | A | 6/1991 | Borchardt | 166/308 |
| 5,067,566 | A | 11/1991 | Dawson | 166/308 |
| 5,074,359 | A | 12/1991 | Schmidt | 166/280 |
| 5,106,518 | A | 4/1992 | Cooney et al. | 252/8.551 |
| 5,110,486 | A | 5/1992 | Manalastas et al. | 252/8.551 |
| 5,224,546 | A | 7/1993 | Smith et al. | 166/300 |
| 5,228,510 | A | 7/1993 | Jennings, Jr. et al. | 166/263 |
| 5,253,711 | A * | 10/1993 | Mondshine | 166/300 |
| 5,363,919 | A | 11/1994 | Jennings, Jr. | 166/308 |
| 5,402,846 | A | 4/1995 | Jennings, Jr. et al. | 166/259 |
| 5,411,091 | A | 5/1995 | Jennings, Jr. | 166/280 |
| 5,460,226 | A | 10/1995 | Lawson et al. | 166/300 |
| 5,472,049 | A | 12/1995 | Chaffee et al. | 166/250.1 |
| 5,482,116 | A | 1/1996 | El-Rabaa et al. | 166/250.1 |
| 5,488,083 | A | 1/1996 | Kinsey, III et al. | 507/211 |
| 5,497,831 | A | 3/1996 | Hainey et al. | 166/308 |
| 5,551,516 | A | 9/1996 | Norman et al. | 166/308 |
| 5,624,886 | A | 4/1997 | Dawson et al. | 507/217 |
| 5,649,596 | A | 7/1997 | Jones et al. | 166/300 |
| 5,669,447 | A | 9/1997 | Walker et al. | 166/300 |
| 5,693,837 | A | 12/1997 | Smith et al. | 556/148 |
| 5,711,396 | A | 1/1998 | Joerg et al. | 180/444 |
| 5,722,490 | A | 3/1998 | Ebinger | 166/281 |
| 5,755,286 | A | 5/1998 | Ebinger | 166/281 |
| 5,806,597 | A | 9/1998 | Tjon-Joe-Pin et al. | 166/300 |
| 5,807,812 | A | 9/1998 | Smith et al. | 507/238 |
| 5,877,127 | A | 3/1999 | Card et al. | 507/217 |
| 6,016,871 | A | 1/2000 | Burts, Jr. | 166/300 |
| 6,035,936 | A | 3/2000 | Whalen | 166/308 |
| 6,054,417 | A | 4/2000 | Graham et al. | 507/238 |
| 6,060,436 | A | 5/2000 | Snyder et al. | 507/266 |
| 6,069,118 | A | 5/2000 | Hinkel et al. | 507/277 |
| 6,123,394 | A | 9/2000 | Jeffrey | 299/16 |
| 6,133,205 | A | 10/2000 | Jones | 507/276 |
| 6,135,205 | A | 10/2000 | Phillips | 166/297 |
| 6,147,034 | A | 11/2000 | Jones et al. | 507/238 |
| 6,162,766 | A | 12/2000 | Muir et al. | 507/267 |
| 6,169,058 | B1 | 1/2001 | Le et al. | 507/222 |

* cited by examiner

Figure 1

FRACTURING USING GEL WITH ESTER DELAYED BREAKING

CROSS REFERENCE TO RELATED APPLICATIONS

The present application claims priority to U.S. Provisional Patent Application Serial No. 60/260,442 filed Jan. 9, 2001.

FIELD OF THE INVENTION

The invention relates to methods and compositions for treating subterranean formations. More particularly, it relates to methods and compositions for treating a subterranean formation penetrated by a wellbore into which a gel with a high viscosity is injected. This invention specifically relates to a method and composition for reducing the viscosity of the gel upon completion of the well treatment.

BACKGROUND OF THE INVENTION

Viscous well treatment fluids are commonly used in the drilling, completion, and treatment of subterranean formations penetrated by wellbores. A viscous well treatment fluid is generally composed of a polysaccharide or synthetic polymer in an aqueous solution which is crosslinked by an organometallic compound. Examples of well treatments in which metal-crosslinked polymers are used are hydraulic fracturing, gravel packing operations, water blocking, and other well completion operations.

Hydraulic fracturing techniques are widely employed to enhance oil and gas production from subterranean formations. During hydraulic fracturing, fluid is injected into a well bore under high pressure. Once the natural reservoir pressures are exceeded, the fracturing fluid initiates a fracture in the formation which generally continues to grow during pumping. As the fracture widens to a suitable width during the course of the treatment, a propping agent is then also added to the fluid. The treatment design generally requires the fluid to reach a maximum viscosity as it enters the fracture which affects the fracture length and width. The viscosity of most fracturing fluids is generated from water-soluble polysaccharides, such as galactomannans or cellulose derivatives. Employing crosslinking agents, such as borate, titanate, or zirconium ions, can further increase the viscosity. The gelled fluid may be accompanied by a propping agent (i.e., proppant) which results in placement of the proppant within the fracture thus produced. The proppant remains in the produced fracture to prevent the complete closure of the fracture and to form a conductive channel extending from the well bore into the formation being treated once the fracturing fluid is recovered.

In order for the treatment to be successful, it is preferred that the fluid viscosity eventually diminish to levels approaching that of water after the proppant is placed. This allows a portion of the treating fluid to be recovered without producing excessive amounts of proppant after the well is opened and returned to production. The recovery of the fracturing fluid is accomplished by reducing the viscosity of the fluid to a lower value such that it flows naturally from the formation under the influence of formation fluids. This viscosity reduction or conversion is referred to as "breaking" and can be accomplished by incorporating chemical agents, referred to as "breakers," into the initial gel.

Certain gels of fracturing fluids, such as those based upon guar polymers, undergo a natural break without the intervention of a breaking agent. However, the breaking time for such gelled fluids generally is excessive and impractical, being somewhere in the range from greater than 24 hours to in excess of weeks, months, or years depending on reservoir conditions. Accordingly, to decrease the break time of gels used in fracturing, chemical agents are usually incorporated into the gel and become a part of the gel itself. Typically, these agents are either oxidants or enzymes which operate to degrade the polymeric gel structure. Most degradation or "breaking" is caused by oxidizing agents, such as persulfate salts (used either as is or encapsulated), chromous salts, organic peroxides or alkaline earth or zinc peroxide salts, or by enzymes.

In addition to the importance of providing a breaking mechanism for the gelled fluid to facilitate recovery of the fluid and to resume production, the timing of the break is also of great importance. Gels which break prematurely can cause suspended proppant material to settle out of the gel before being introduced a sufficient distance into the produced fracture. Premature breaking can also lead to a premature reduction in the fluid viscosity, resulting in a less than desirable fracture width in the formation causing excessive injection pressures and premature termination of the treatment.

On the other hand, gelled fluids which break too slowly can cause slow recovery of the fracturing fluid from the produced fracture with attendant delay in resuming the production of formation fluids and severely impair anticipated hydrocarbon production. Additional problems may occur, such as the tendency of proppant to become dislodged from the fracture, resulting in at least partial closing and decreased efficiency of the fracturing operation. Preferably, the fracturing gel should begin to break when the pumping operations are concluded. For practical purposes, the gel preferably should be completely broken within about 24 hours after completion of the fracturing treatment.

U.S. Pat. No. 3,960,736 (issued Jun. 1, 1976) suggests the use of acetal esters and polysaccharides in well treatment compositions. The acetal esters hydrolyze to release the component alcohols and acids, which subsequently catalyze breakdown of the polysaccharides. This breakdown reduces the viscosity of the composition.

U.S. Pat. No. 5,224,546 (issued Jun. 6, 1993) offers the use of an esterified carboxylated chelator for the hydrolysis of metal crosslinked polymer gels used in oil and gas well applications. At elevated temperatures, the esterified chelator undergoes hydrolysis to form an acid and an active ligand which subsequently removes the crosslinking metal ion from the gel and hydrolyses the polymer. This reduces the viscosity of the gel and allows removal of the material after treatment of the well.

For the foregoing reasons, there is a continuing need for a well treatment fluid which could maintain a relatively high viscosity while it is injected into a wellbore. After a sufficient period of time to allow complete well treatment, the viscosity of the fluid should decrease to a level such that the fluid could be removed relatively easily.

SUMMARY OF THE INVENTION

Most fluid breakers either reduce the fluid viscosity too soon or, on the other extreme, provide incomplete viscosity reduction. It has been discovered that a synergistic effect occurs between certain inorganic oxidizing agents and certain organic esters. Particularly, oxidizing salts having alkaline earth or transition metal cations and polycarboxylic esters are the most suitable mixtures. This combination of chemicals has been found to provide initial high viscosity fluids while also providing complete fluid degradation at later times. This combination allows for optimum fracture growth and proppant placement while enhancing the amount of treating fluid recovered after the well is placed back on production. Ultimately, this effect significantly improves well productivity.

DESCRIPTION OF THE FIGURES

The following FIGURE forms part of the present specification and is included to further demonstrate certain aspects of the present invention. The invention may be better understood by reference to the FIGURE in combination with the detailed description of specific embodiments presented herein.

DETAILED DESCRIPTION OF THE INVENTION

The aforementioned need is met by embodiments of the invention in one or more of the following aspects. In one aspect, the invention relates to a well treatment fluid composition. The composition comprises a solvent, a polymer soluble or hydratable in the solvent, a crosslinking agent, an inorganic breaking agent, and a ester compound. Preferably, the solvent includes water, and the polymer is hydratable in water. The solvent may be an aqueous potassium chloride solution. The inorganic breaking agent may be a metal-based oxidizing agent, such as an alkaline earth metal or a transition metal. The inorganic breaking agent may be magnesium peroxide, calcium peroxide, or zinc peroxide. The ester compound may be an ester of a polycarboxylic acid. For example, the ester compound may be an ester of oxalate, citrate, or ethylene diamine tetraacetate. The ester compound having hydroxyl groups can also be acetylated. An example of this is that citric acid can be acetylated to form acetyl triethyl citrate. A presently preferred ester is acetyl triethyl citrate. The hydratable polymer may be a water soluble polysaccharide, such as galactomannan, cellulose, or derivatives thereof. The crosslinking agent may be a borate, titanate, or zirconium-containing compound. For example, the crosslinking agent can be sodium borate×$H_2O$ (varying waters of hydration), boric acid, borate crosslinkers (a mixture of a titanate constituent, preferably an organotitanate constituent, with a boron constituent. The organotitanate constituent can be TYZOR® titanium chelate esters from E.I du Pont de Nemours & Company. The organotitanate constituent can be a mixture of a first organotitanate compound having a lactate base and a second organotitanate compound having triethanolamine base. The boron constituent can be selected from the group consisting of boric acid, sodium tetraborate, and mixtures thereof. These are described in U.S. Pat. No. 4,514,309.), borate based ores such as ulexite and colemanite, Ti(IV) acetylacetonate, Ti(IV) triethanolamine, Zr lactate, Zr triethanolamine, Zr lactate-triethanolamine, or Zr lactate-triethanolamine-triisopropanolamine. In some embodiments, the well treatment fluid composition may further comprise a proppant.

In another aspect, the invention relates to a well treatment fluid composition. The composition includes a solvent, a polymer soluble or hydratable in the solvent, a crosslinking agent, an alkaline earth metal or a transition metal-based breaking agent, and an ester of a carboxylic acid. The breaking agent may be magnesium peroxide, calcium peroxide, or zinc peroxide. A presently preferred ester is acetyl triethyl citrate. The solvent may include water, and the polymer is hydratable in water. The solvent may be an aqueous potassium chloride solution. The hydratable polymer may be a polysaccharide.

In still another aspect, the invention relates to a method of treating a subterranean formation. The method comprises: formulating a fracturing fluid comprising a solvent, a polymer soluble or hydratable in the solvent, a crosslinking agent, an inorganic breaking agent, and an ester compound; and injecting the fracturing fluid into a bore hole to contact at least a part of the formation by the fracturing fluid under a sufficient pressure to fracture the formation. The fracturing fluid has a viscosity that changes in response to a condition. The method may further comprise removing the fracturing fluid after the viscosity of the fracturing fluid is reduced. In some embodiments, the method may further comprise injecting a proppant into the formation. The proppant may be injected into the formation with the fracturing fluid. The fracturing fluid may have a pH at or above about 7. Preferably, the fracturing fluid should have a pH in the range of about 8 to about 12. The inorganic breaking agent may be a metal-based oxidizing agent. The metal may be an alkaline earth metal or a transition metal. The inorganic breaking agent may be magnesium peroxide, calcium peroxide, or zinc peroxide. The ester compound may be an ester of an polycarboxylic acid, such as an ester of oxalate, citrate, or ethylene diamine tetraacetate. A presently preferred ester compound is acetyl triethyl citrate. Preferably, the solvent includes water, and the polymer is a water soluble polysaccharide, such as galactomannan, cellulose, or derivatives thereof. The solvent may be an aqueous potassium chloride solution. The crosslinking agent may be a borate, titanate, or zirconium-containing compound. The fracturing fluid can further comprise sodium thiosulfate.

Embodiments of the invention provide a well treatment fluid composition and a method of using the fluid composition to treat subterranean formations. The well treatment fluid composition can be used in hydraulic fracturing as a fracturing fluid, gravel packing operations, water blocking, temporary plugs for purposes of wellbore isolation and/or fluid loss control and other well completion operations. Most well treatment fluids are aqueous, although non-aqueous fluids may be formulated and used as well.

The well treatment fluid composition comprises a solvent (such as water), a polymer soluble or hydratable in the solvent, a crosslinking agent, an inorganic breaking agent, and an ester compound. Optionally, the well treatment fluid composition may further include various other fluid additives, such as pH buffers, biocides, stabilizers, propping agents (i.e., proppants), mutual solvents, and surfactants designed to prevent emulsion with formation fluids, to reduce surface tension, to enhance load recovery, and/or to foam the fracturing fluid. The well treatment fluid composition may also contain one or more salts, such as potassium chloride, magnesium chloride, sodium chloride, calcium chloride, tetramethyl ammonium chloride, and mixtures thereof. It is found that a fracturing fluid made in accordance with embodiments of the invention exhibits reduced or minimal premature breaking and breaks completely or substantially completely after a well treatment is finished.

"Premature breaking" as used herein refers to a phenomenon in which a gel viscosity becomes diminished to an undesirable extent before all of the fluid is introduced into the formation to be fractured. Thus, to be satisfactory, the gel viscosity should preferably remain in the range from about 50% to about 75% of the initial viscosity of the gel for at least two hours of exposure to the expected operating temperature. Preferably the fluid should have a viscosity in excess of 100 centipoise (cP) at 100 $sec^{-1}$ while injection into the reservoir as measured on a Fann 50 C viscometer in the laboratory.

"Complete breaking" as used herein refers to a phenomenon in which the viscosity of a gel is reduced to such a level that the gel can be flushed from the formation by the flowing formation fluids or that it can be recovered by a swabbing operation. In laboratory settings, a completely broken, non-crosslinked gel is one whose viscosity is about 10 cP or less as measured on a Model 35 Fann viscometer having a R1B1 rotor and bob assembly rotating at 300 rpm.

An aqueous fracturing fluid may be prepared by blending a hydratable polymer with an aqueous base fluid. The base aqueous fluid can be, for example, water or brine. Any suitable mixing apparatus may be used for this procedure. In the case of batch mixing, the hydratable polymer and aqueous fluid are blended for a period of time which is sufficient to form a hydrated sol.

Suitable hydratable polymers that may be used in embodiments of the invention include any of the hydratable polysaccharides which are capable of forming a gel in the presence of a crosslinking agent. For instance, suitable hydratable polysaccharides include, but are not limited to, galactomannan gums, glucomannan gums, guars, derived guars, and cellulose derivatives. Specific examples are guar gum, guar gum derivatives, locust bean gum, Karaya gum, carboxymethyl cellulose, carboxymethyl hydroxyethyl cellulose, and hydroxyethyl cellulose. Presently preferred gelling agents include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art.

The hydratable polymer may be present in the fluid in concentrations ranging from about 0.10% to about 5.0% by weight of the aqueous fluid. A preferred range for the hydratable polymer is about 0.20% to about 0.80% by weight.

A suitable crosslinking agent can be any compound that increases the viscosity of the fluid by chemical crosslinking, physical crosslinking, or any other mechanisms. For example, the gellation of a hydratable polymer can be achieved by crosslinking the polymer with metal ions including boron, zirconium, and titanium containing compounds, or mixtures thereof. One class of suitable crosslinking agents is organotitanates. Another class of suitable crosslinking agents is borates as described, for example, in U.S. Pat. No. 4,514,309. The selection of an appropriate crosslinking agent depends upon the type of treatment to be performed and the hydratable polymer to be used. The amount of the crosslinking agent used also depends upon the well conditions and the type of treatment to be effected, but is generally in the range of from about 10 ppm to about 1000 ppm of metal ion of the crosslinking agent in the hydratable polymer fluid. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

The pH of an aqueous fluid which contains a hydratable polymer can be adjusted if necessary to render the fluid compatible with a crosslinking agent. Preferably, a pH adjusting material is added to the aqueous fluid after the addition of the polymer to the aqueous fluid. Typical materials for adjusting the pH are commonly used acids, acid buffers, and mixtures of acids and bases. For example, sodium bicarbonate, potassium carbonate, sodium hydroxide, potassium hydroxide, and sodium carbonate are typical pH adjusting agents. Acceptable pH values for the fluid may range from neutral to basic, i.e., from about 5 to about 14. Preferably, the pH is kept neutral or basic, i.e., from about 7 to about 14, more preferably between about 8 to about 12.

The term "breaking agent" or "breaker" refers to any chemical that is capable of reducing the viscosity of a gelled fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. This reduction in viscosity of the treating fluid is commonly referred to as "breaking". Consequently, the chemicals used to break the viscosity of the fluid is referred to as a breaking agent or a breaker.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. (149° C.). or higher will generally break the fluid relatively quickly without the aid of an oxidizing agent.

Examples of inorganic breaking agents for use in this invention include, but are not limited to, persulfates, percarbonates, perborates, peroxides, perphosphates, permanganates, etc. Specific examples of inorganic breaking agents include, but are not limited to, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, and so on. Additional suitable breaking agents are disclosed in U.S. Pat. Nos. 5,877,127; 5,649,596; 5,669,447; 5,624,886; 5,106,518; 6,162,766; and 5,807,812. In some embodiments, an inorganic breaking agent is selected from alkaline earth metal or transition metal-based oxidizing agents, such as magnesium peroxides, zinc peroxides, and calcium peroxides.

In addition, enzymatic breakers may also be used in place of or in addition to a non-enzymatic breaker. Examples of suitable enzymatic breakers such as guar specific enzymes, alpha and beta amylases, amyloglucosidase, aligoglucosidase, invertase, maltase, cellulase, and hemicellulase are disclosed in U.S. Pat. Nos. 5,806,597 and 5,067,566.

A breaking agent or breaker may be used "as is" or be encapsulated and activated by a variety of mechanisms including crushing by formation closure or dissolution by formation fluids. Such techniques are disclosed, for example, in U.S. Pat. Nos. 4,506,734; 4,741,401; 5,110,486; and 3,163,219.

Suitable ester compounds include any ester which is capable of assisting the breaker in degrading the viscous fluid in a controlled manner, i.e., providing delayed breaking initially and substantially complete breaking after well treatment is completed. An ester compound is defined as a compound that includes one or more carboxylate groups: R—COO—, wherein R is phenyl, methoxyphenyl, alkylphenyl, $C_1$–$C_{11}$ alkyl, $C_1$–$C_{11}$ substituted alkyl, substituted phenyl, or other organic radicals. Suitable esters include, but are not limited to, diesters, triesters, etc.

An ester is typically formed by a condensation reaction between an alcohol and an acid by eliminating one or more water molecules. Preferably, the acid is an organic acid, such as a carboxylic acid. A carboxylic acid refers to any of a family of organic acids characterized as polycarboxylic acids and by the presence of more than one carboxyl group. In additional to carbon, hydrogen, and oxygen, a carboxylic acid may include heteroatoms, such as S, N, P, B, Si, F, Cl, Br, and I. In some embodiments, a suitable ester compound is an ester of oxalic, malonic, succinic, malic, tartaric, citrate, phthalic, ethylenediaminetetraacetic (EDTA), nitrilotriacetic, phosphoric acids, etc. Moreover, suitable esters also include the esters of glycolic acid. The alkyl group in an ester that comes from the corresponding alcohol includes any alkyl group, both substituted or unsubstituted. Preferably, the alkyl group has one to about ten carbon atoms per group. It was found that the number of carbon atoms on the alkyl group affects the water solubility of the resulting ester. For example, esters made from $C_1$–$C_2$ alcohols, such as methanol and ethanol, have relatively higher water solubility. Thus, application temperature range for these esters may range from about 120° F. to about 250° F. (about 49° C. to about 121° C.). For higher temperature applications, esters formed from $C_3$–$C_{10}$ alcohols, such as n-propanol, butanol, hexanol, and cyclohexanol, may be used. Of course, esters formed from $C_{11}$ or higher alcohols may also be used. In some embodiments, mixed esters, such as acetyl methyl dibutyl citrate, may be used for high temperature applications. Mixed esters refer to those esters made from polycarboxylic acid with two or more different alcohols in a single condensation reaction. For example, acetyl methyl dibutyl citrate may be prepared by condensing citric acid with both methanol and butanol and then followed by acylation.

Specific examples of the alkyl groups originating from an alcohol include, but are not limited to, methyl, ethyl, propyl, butyl, iso-butyl, 2-butyl, t-butyl, benzyl, p-methoxybenzyl, m-methoxybenxyl, chlorobenzyl, p-chlorobenzyl, phenyl, hexyl, pentyl, etc. Specific examples of suitable ester compounds include, but are not limited to, triethyl phosphate, diethyl oxalate, dimethyl phthalate, dibutyl phthalate, diethyl maleate, diethyl tartrate, 2-ethoxyethyl acetate, ethyl acetylacetate, triethyl citrate, acetyl triethyl citrate, tetracyclohexyl EDTA, tetra-1-octyl EDTA, tetra-n-butyl EDTA, tetrabenzyl EDTA, tetramethyl EDTA, etc. Additional suitable ester compounds are described, for example, in the following U.S. Pat. Nos. 3,990,978; 3,960,736; 5,067,556; 5,224,546; 4,795,574; 5,693,837; 6,054,417; 6,069,118; 6,060,436; 6,035,936; 6,147,034; and 6,133,205.

When an ester of a polycarboxylic acid is used, total esterification of the acid functionality is preferred, although a partially esterified compound may also be used in place of or in addition to a totally esterified compound. In these embodiments, phosphate esters are not used alone. A phosphate ester refers to a condensation product between an alcohol and a phosphorus acid or a phosphoric acid and metal salts thereof. However, in these embodiments, combination of a polycarboxylic acid ester with a phosphate ester may be used to assist the degradation of a viscous gel.

When esters of polycarboxylic acids, such as esters of oxalic, malonic, succinic, malic, tartaric, citrate, phthalic, ethylenediaminetetraacetic (EDTA), nitrilotriacetic, and other carboxylic acids are used, it was observed that these esters assist metal based oxidizing agents (such as alkaline earth metal or zinc peroxide) in the degradation of fracturing fluids. It was found that the addition of 0.1 gal/Mgal (0.1 l/m³) to 5 gal/Mgal (5 l/m³) of these esters significantly improves the degradation of the fracturing fluid. More importantly, the degradation response is delayed, allowing the fracturing fluid ample time to create the fracture and place the proppant prior to the degradation reactions. The delayed reduction in viscosity is likely due to the relatively slow hydrolysis of the ester, which forms polycarboxylate anions as hydrolysis products. These polycarboxylate anions, in turn, improve the solubility of metal based oxidizing agents by sequestering the metal associated with the oxidizing agents. This may have promoted a relatively rapid decomposition of the oxidizing agent and caused the fracturing fluid degradation.

Generally, the temperature and the pH of a fracturing fluid affects the rate of hydrolysis of an ester. For downhole operations, the bottom hole static temperature ("BHST") cannot be easily controlled or changed. The pH of a fracturing fluid usually is adjusted to a level to assure proper fluid performance during the fracturing treatment. Therefore, the rate of hydrolysis of an ester could not be easily changed by altering BHST or the pH of a fracturing fluid. However, the rate of hydrolysis may be controlled by the amount of an ester used in a fracturing fluid. For higher temperature applications, the hydrolysis of an ester may be retarded or delayed by dissolving the ester in a hydrocarbon solvent. Moreover, the delay time may be adjusted by selecting esters that provide more or less water solubility. For example, for low temperature applications, polycarboxylic esters made from low molecular weight alcohols, such as methanol or ethanol, are recommended. The application temperature range for these esters could range from about 120° F. to about 250° F. (about 49° C. to about 121° C.). On the other hand, for higher temperature applications or longer injection times, esters made from higher molecular weight alcohols should preferably be used. The higher molecular weight alcohols include, but are not limited to, $C_3$–$C_6$ alcohols, e.g., n-propanol, hexanol, and cyclohexanol.

In some embodiments, esters of citric acid are used in formulating a well treatment fluid. A preferred ester of citric acid is acetyl triethyl citrate, which is available under the trade name Citraflex A2 from Morflex, Inc., Greensboro, N.C.

As described previously, propping agents or proppants are typically added to the fracturing fluid prior to the addition of a crosslinking agent. However, proppants may be introduced in any manner which achieves the desired result. Any proppant may be used in embodiments of the invention. Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, and so on.

The well treatment fluid composition in accordance with embodiments of the invention has many useful applications. For example, it may be used in hydraulic fracturing, gravel packing operations, water blocking, temporary plugs for purposes of wellbore isolation and/or fluid loss control, and other well completion operations. One application of the fluid composition is to use it as a fracturing fluid.

Accordingly, embodiments of the invention also provide a method of treating a subterranean formation. The method includes formulating a fracturing fluid comprising an aqueous fluid, a hydratable polymer, a crosslinking agent, an inorganic breaking agent, and an ester compound; and injecting the fracturing fluid into a bore hole to contact at least a part of the formation by the fracturing fluid under a sufficient pressure to fracture the formation. Initially, the viscosity of the fracturing fluid should be maintained above at least 200 cP at 40 $\sec^{-1}$ during injection and, afterwards, should be reduced to less than 200 cP at 40 $\sec^{-1}$. After the viscosity of the fracturing fluid is lowered to an acceptable level, at least a portion of the fracturing fluid is removed from the formation. During the fracturing process, a proppant can be injected into the formation simultaneously with the fracturing fluid. Preferably, the fracturing fluid has a pH around or above about 7, more preferably in the range of about 8 to about 12.

It should be understood that the above-described method is only one way to carry out embodiments of the invention. The following U.S. patents disclose various techniques for conducting hydraulic fracturing which may be employed in embodiments of the invention with or without modifications: U.S. Pat. Nos. 6,169,058; 6,135,205; 6,123,394; 6,016,871; 5,755,286; 5,722,490; 5,711,396; 5,551,516; 5,497,831; 5,488,083; 5,482,116; 5,472,049; 5,411,091; 5,402,846; 5,392,195; 5,363,919; 5,228,510; 5,074,359; 5,024,276; 5,005,645; 4,938,286; 4,926,940; 4,892,147; 4,869,322; 4,852,650; 4,848,468; 4,846,277; 4,830,106; 4,817,717; 4,779,680; 4,479,041; 4,739,834; 4,724,905; 4,718,490; 4,714,115; 4,705,113; 4,660,643; 4,657,081; 4,623,021; 4,549,608; 4,541,935; 4,378,845; 4,067,389; 4,007,792; 3,965,982; and 3,933,205.

As described above, a well treatment fluid may include a number of components. Table 1 below exemplifies some preferred compositional ranges for the fluid. It should be understood that compositions outside the indicated ranges are also within the scope of the invention.

TABLE 1

Exemplary Composition Ranges

| Component | Presently Preferred Range | Presently More Preferred Range | Presently Most Preferred Range |
|---|---|---|---|
| Hydratable Polymer | 0.1–5.0 wt % | 0.14–1.0 wt % | 0.2–0.8 wt % |
| Crosslinking Agent | 0.1–1000 ppm | 1–500 ppm | 10–100 ppm |
| Inorganic Breaking Agent | 0.025–25 lb/Mgal (0.0146–14.55 kg/m$^3$) | 0.05–10 lb/Mgal (0.0291–5.82 kg/m$^3$) | 0.25–5 lb/Mgal (0.146–2.91 kg/m$^3$) |
| Ester | 0.01–10 gal/Mgal (0.01–10 l/m$^3$) | 0.1–5 gal/Mgal (0.1–5 l/m$^3$) | 0.25–3 gal/Mgal (0.25–3 l/m$^3$) |
| Proppant | 0–30 lb/gal (0–3595 kg/m$^3$) | 0–20 lb/gal (0–2397 kg/m$^3$) | 0–10 lb/gal (0–1198 kg/m$^3$) |
| pH Buffer | 5–14 | 7–13 | 8–12 |

In Table 1, the wt % of polymer is the weight of polymer divided by the total weight of the well treatment fluid, converted to percent. The crosslinking agent is in parts per million parts well treatment fluid. The breaking agent is in pounds per thousand gallons of well treatment fluid. The ester is in gallons per thousand gallons of well treatment fluid. The proppant is in pounds per gallon of well treatment fluid. While the compositions have been described as comprising various components, they can also be formulated to consist essentially of or consist of the various components.

The following examples are presented to illustrate embodiments of the invention. None of the examples is intended, nor should it be construed, to limit the invention as otherwise described and claimed herein. All numerical values are approximate. Numerical ranges, if given, are merely exemplary. Embodiments outside the given numerical ranges may nevertheless fall within the scope of the invention as claimed.

EXAMPLES

Example 1

Fracturing Fluid Lacking Both Breaker and Ester

In this example the viscosity of a fracturing fluid that did not contain either a breaker or an ester was obtained to provide a reference point for comparison. A fracturing fluid was prepared by adding 2.64 g of carboxymethyl guar to 1 L of water. Afterwards, 1 ml of a 50% aqueous tetramethylammonium chloride solution, 1 ml of a surfactant designed to assist fluid flowback from the well after treatment and 0.25 ml of a surfactant blend designed to prevent emulsions between the fracturing fluid and formation fluids were added to the hydrating polymer solution. After about 30 minutes, the pH of the fluid was adjusted to 10.45 with a potassium hydroxide and potassium carbonate solution followed by the addition of 1.5 ml of a zirconium based crosslinker solution having a $ZrO_2$ content of about 5.8 wt %.

About 45 g of this solution was weighed into a Fann 50C cup. The cup was then placed on the Fann 50C viscometer and pressured to about 200 psi with $N_2$. The sample in the cup was sheared at 450 $\sec^{-1}$ for 2 minutes followed by a rate sweep using 105, 85, 64 and 42 $\sec^{-1}$ for about 2 minutes. Afterwards, a preset oil bath set to 250° F. (121° C.) was raised to heat the sample to the 250° F. (121° C.) test conditions. The rate sweep was repeated every 30 minutes and the interim rate between sweeps was 105 $\sec^{-1}$. The stresses associated with each rate used in the sweep together with the rates were used to calculate the power low indices n' and K'. The n' is referred to as the flow behavior index, and the K' is the consistency index in the American Petroleum Institute ("API") Bulletin RP-39. The bulletin also provides a method to calculate the viscosity of pseudoplastic fracturing fluid using the n' and K' values. The calculated viscosities of the fluid described in this example and the following examples are presented at 40 $\sec^{-1}$.

The fluid in this example showed an initial viscosity of 935 cP at 40 $\sec^{-1}$ and a temperature of 249° F. (120° C.). After two hours, the fluid viscosity slightly increased to 960 cP at 40 $\sec^{-1}$ and a fluid pH of 9.4. Generally, a viscosity of 200 cP at 40 $\sec^{-1}$ is considered necessary to transport proppant during the fracturing treatment. This fluid shows no sign of degrading in the first two hours.

Example 2

Fracturing Fluid Containing Magnesium Peroxide

The experiment in Example 1 was repeated but also included 0.12 g of magnesium peroxide. The initial viscosity of this fluid at the tested temperature was found to be 755 cP at 40 $\sec^{-1}$, and the viscosity declined to less than 200 cP at 40 $\sec^{-1}$ in about 2 hours; but the fluid retained a viscosity of about 50 cP at 40 $\sec^{-1}$ for 16 hours.

Example 3

Fracturing Fluid Containing Magnesium Peroxide and Acetyl Triethyl Citrate

The experiment in Example 1 was repeated but also included 0.12 g of magnesium peroxide and 0.25 mL of acetyl triethyl citrate (acetyl triethyl citrate is a liquid with a density of 9.47 lb/gal). The initial viscosity of this fluid was found to be 892 cP at 40 sec$^{-1}$, and the viscosity declined to less than 200 cP at 40 sec$^{-1}$ in about 5.5 hours; but the fluid retained a viscosity of about 35 cP at 40 sec$^{-1}$ for 16 hours, and the fluid pH was about 8.80.

Example 4

Fracturing Fluid Containing Magnesium Peroxide and Acetyl Triethyl Citrate

The experiment in Example 1 was repeated but also included 0.12 g of magnesium peroxide and 0.50 mL of acetyl triethyl citrate. The initial viscosity of this fluid was found to be 659 cP at 40 sec$^{-1}$, and the viscosity declined to less than 200 cP at 40 sec$^{-1}$ in about 7 hours; but the fluid retained a viscosity of about 46 cP at 40 sec$^{-1}$ for 16 hours and the fluid pH was about 8.20.

Example 5

Fracturing Fluid Containing Magnesium Peroxide and Acetyl Triethyl Citrate

The experiment in Example 1 was repeated but also included 0.12 g of magnesium peroxide and 0.75 mL of acetyl triethyl citrate. The initial viscosity of this fluid was found to be 795 cP at 40 sec$^{-1}$, and the viscosity declined to less than 200 cP at 40 sec$^{-1}$ in about 5 hours; but the fluid retained a viscosity of about 45 cP at 40 sec$^{-1}$ for 16 hours and the fluid pH was 7.67.

Example 6

Fracturing Fluid Containing Magnesium Peroxide and Acetyl Triethyl Citrate

The experiment in Example 1 was repeated but also included 0.12 g of magnesium peroxide and 1.0 mL of acetyl triethyl citrate. The initial viscosity of this fluid was found to be 565 cP at 40 sec$^{-1}$, and the viscosity declined to less than 200 cP at 40 sec$^{-1}$ in about 4 hours, but the fluid retained the viscosity of about 7 cP at 40 sec$^{-1}$ for 10 hours and the fluid pH was 7.26.

Example 7

Composition of Example Fluids

The content of the fracturing fluids from Examples 1–6 are summarized in Table 2 below.

Example 8

Compilation of Viscosity Data

The data obtained from Examples 1–6 are summarized in Table 3 below.

TABLE 3

Viscosity Data for Various Fracturing Fluids

| Time (min) | Example 1 (cP) | Example 2 (cP) | Example 3 (cP) | Example 4 (cP) | Example 5 (cP) | Example 6 (cP) |
|---|---|---|---|---|---|---|
| 30 | 935 | 755 | 892 | 659 | 795 | 565 |
| 60 | 944 | 484 | 822 | 692 | 882 | 593 |
| 90 | 919 | 350 | 710 | 696 | 788 | 635 |
| 120 | 960 | 274 | 626 | 654 | 686 | 682 |
| 240 | — | 185 | 327 | 446 | 348 | 366 |
| 1000 | — | 55 | 30 | 42 | 43 | 7 | viscosity data were obtained at 250° F. (121° C.) and 40 sec$^{-1}$.

Figure 1:
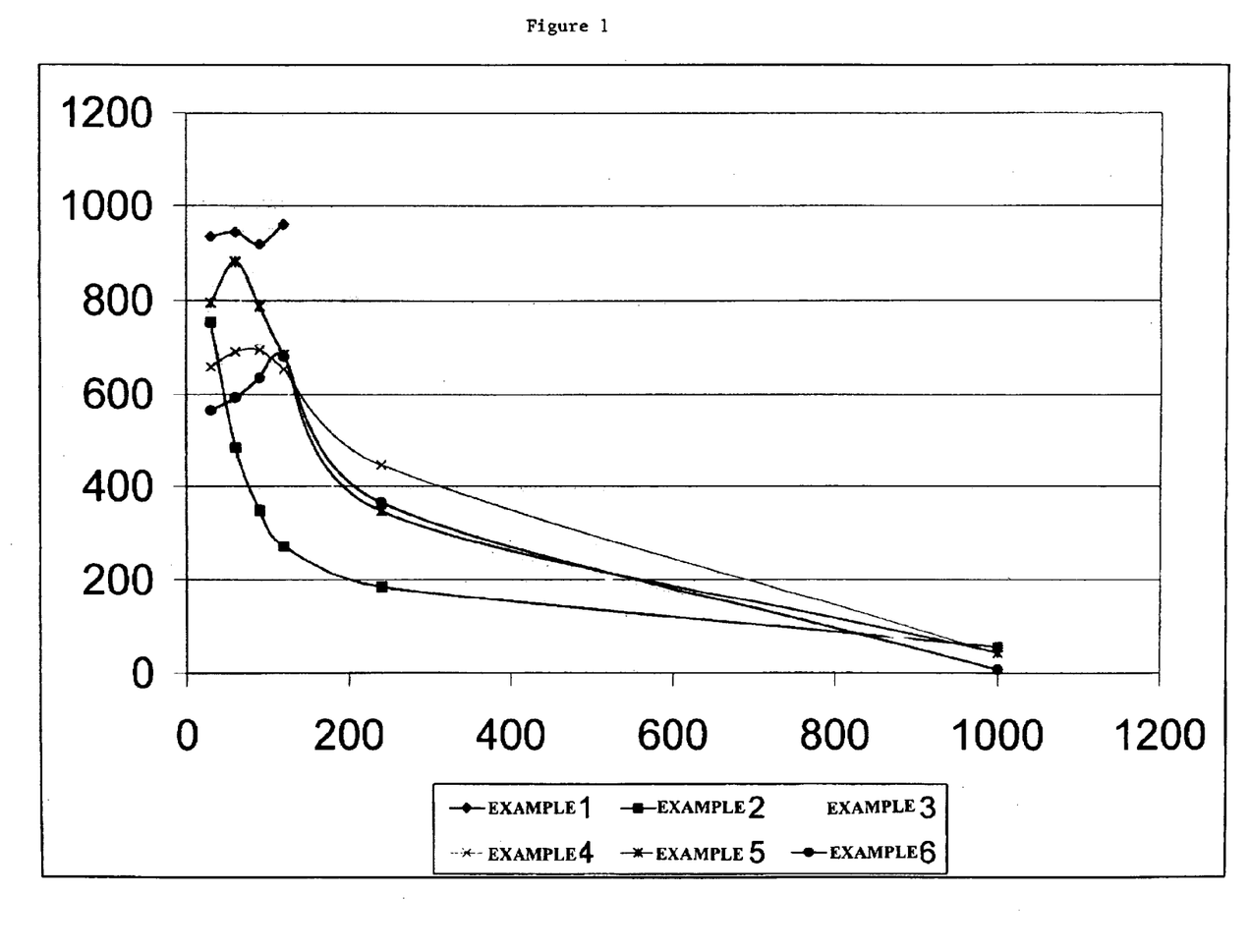
FIG. 1 is a plot of viscosity curves as a function of time for various well treatment fluids.

FIG. 1 is a plot of viscosity curves as a function of time for the fracturing fluids of Examples 1–6. Both the FIGURE and the data show that the citrate ester initially stabilized the gel followed by complete or substantially complete breaks, especially as the ester concentration approaches 0.1% by volume. The FIGURE indicates that initial stability of the fluid and improved fluid degradation were achieved. This should allow the fracturing fluid to generate desired fracture geometry and provide adequate proppant transport and placement.

Example 9

Effects of Butyl Citrate and Magnesium Peroxide on Fracturing Fluid Degradation Three fracturing fluids were individually prepared by adding 3.36 g of carboxymethyl guar to 1 L of water. Afterwards, 1 ml of a 50% aqueous tetramethylammonium chloride solution was added to each fluid. After about 30 minutes, 0.36 g of sodium thiosulfate was added to each fluid and the pH of the fluids were adjusted to 10.45 with a potassium hydroxide and potassium carbonate solution followed by the addition of 1.5 ml of a zirconium based crosslinker solution having a ZrO$_2$ content of about 5.8%. The fluids also treated with breakers. The first fluid contained 0.12 g magnesium peroxide, the second fluid contained 1 ml of tributyl citrate, and the third fluid contained

TABLE 2

Composition of fracturing fluids

| Component | Ex. 1 | Ex. 2 | Ex. 3 | Ex. 4 | Ex. 5 | Ex. 6 |
|---|---|---|---|---|---|---|
| Polymer | 0.264% | 0.264% | 0.264% | 0.264% | 0.264% | 0.264% |
| Crosslinker | 87 ppm | 87 ppm | 87 ppm | 87 ppm | 87 ppm | 87 ppm |
| Breaker | — | 1 lb/Mgal 0.582 kg/m$^3$ | 1 lb/Mgal 0.582 kg/m$^3$ | 1 lb/Mgal 0.582 kg/m$^3$ | 1 lb/Mgal 0.582 kg/m$^3$ | 1 lb/Mgal 0.582 kg/m$^3$ |
| Ester | — | — | 0.25 gal/Mgal 0.25 l/m$^3$ | 0.5 gal/Mgal 0.5 l/m$^3$ | 0.75 gal/Mgal 0.75 l/m$^3$ | 1.0 gal/Mgal 1.0 l/m$^3$ |
| Proppant | — | — | — | — | — | — |
| pH | 10.45 | 10.45 | 10.45 | 10.45 | 10.45 | 10.45 |

0.12 g magnesium peroxide and 1 ml of acetyltributyl citrate (ATBC, density of 8.75 lb/gal). The viscosity in cP at 100 sec$^{-1}$ of each fluid at 275° F. (135° C.) is shown in Table 4.

TABLE 4

Viscosity of fluids

| Time (minutes) | Fluid 1<br>0.12 g MgO2 | Fluid 2<br>1 ml ATBC | Fluid 3<br>0.12 g MgO2 + 1 ml ATBC |
|---|---|---|---|
| 30 | 893 | 785 | 849 |
| 60 | 570 | 543 | 584 |
| 90 | 219 | 393 | 368 |
| 120 | 75 | 311 | 214 |
| 150 | 25 | 256 | 132 |
| 180 | 9 | 215 | 80 |
| 210 | 6 | 180 | 46 |
| 600 | 1 | 26 | 1 |

These results show that Fluid 1 containing 0.12 g MgO$_2$ has a limited pump time of about 90 minutes. Pump time is defined as the time the fluid viscosity exceeds 100 cP at 100 sec$^{-1}$. Although the ester by itself has longer pump time in excess of 3.5 hours, it does not completely degrade. However, the mixture of the peroxide and ester gives a longer pump time than does the peroxide alone, in excess of 2.5 hours, and it also completely degrades the fluid to about 1 cP. Sodium thiosulfate appears to control, in part, the length of time that the fluid maintains front end stability.

The composition of the three fluids was as shown below in Table 5.

TABLE 5

Composition of Fluids 1–3

| Component | Fluid 1 | Fluid 2 | Fluid 3 |
|---|---|---|---|
| Polymer | 0.336% | 0.336% | 0.336% |
| Crosslinker, ZrO2 | 87 ppm | 87 ppm | 87 ppm |
| Breaker, MgO2 | 1 lb/Mgal<br>0.582 kg/m$^3$ | — | 1 lb/Mgal<br>0.582 kg/m$^3$ |
| Ester, acetyltributyl citrate | — | 1 gal/Mgal<br>1 l/m$^3$ | 1 gal/Mgal<br>1 l/m$^3$ |
| Proppant | — | — | — |
| Gel stabilizer, sodium thiosulfate | 3 lb/Mgal<br>1.746 kg/m$^3$ | 3 lb/Mgal<br>1.746 kg/m$^3$ | 3 lb/Mgal<br>1.746 kg/m$^3$ |
| pH | 10.45 | 10.45 | 10.45 |

Example 10

Relationship between Inorganic Peroxide and Ester in a Fracturing Fluid

To better understand the relationship between the inorganic peroxide and the ester in a fracturing fluid, a Design of Experiments (DOE) process was employed. This DOE process is described by George E. P. Box, William G. Hunter and J. Stuart Hunter in their book *Statistics for Experimenters*, published by John Wiley & Sons in 1978. In the design used in this example, the fracturing fluid was composed of DI water, 22 lb/Mgal (12.8 kg/m$^3$) of carboxymethylguar supplied by BJ Services Company as GW-45, 1 gal/Mgal (1 l/m$^3$) of 50 wt % aqueous tetramethylammonium chloride, and 1 gal/Mgal (1 l/m$^3$) of a zirconium crosslinker having a zirconium content of about 5.8 wt % as ZrO$_2$. The parameters and their ranges are defined in Table 6.

TABLE 6

DOE Parameters and Ranges

| Parameter | Low Value(−1) | Center Value | High Value(+1) |
|---|---|---|---|
| Temperature | 200° F.(93° C.) | 237.5° F.<br>(114° C.) | 275° F.(135° C.) |
| Magnesium Peroxide | 1 lb/Mgal<br>(0.582 kg/m$^3$) | 2 lb/Mgal<br>(1.164 kg/m$^3$) | 3 lb/Mgal<br>(1.746 kg/m$^3$) |
| Acetyltriethyl citrate | 0.5 gal/Mgal<br>(0.5 l/m$^3$) | 1.25 gal/Mgal<br>(1.25 l/m$^3$) | 2.0 gal/Mgal<br>(2.0 l/m$^3$) |
| Sodium Thiosulfate | 0.5 lb/Mgal<br>(0.291 kg/m$^3$) | 2.75 lb/Mgal<br>(1.60 kg/m$^3$) | 5 lb/Mgal<br>(2.91 kg/m$^3$) |

This DOE was a two level factorial with six center point measurements requiring 22 Fann 50C runs conducted as described in Example 1. Each Fann run required 8 hours of continuous shear with the rate sweeps occurring as also defined in Example 1. The viscosity data at 40 sec$^{-1}$ was transformed to their logarithmic values for better interpretation. The results of the analysis is presented in Table 7.

TABLE 7

DOE Analysis

| Parameter | 1 Hour | 2 Hours | 4 Hours | 8 Hours |
|---|---|---|---|---|
| Grand Mean | 2.11 | 1.88 | 1.59 | 1.35 |
| Temperature | −0.43 | −0.53 | −0.58 | −0.53 |
| MgO$_2$ | −0.01 | — | — | — |
| Ester | −0.23 | −0.22 | −0.21 | −0.22 |
| Na Thiosulfate | 0.26 | 0.31 | 0.34 | 0.32 |
| Temp*Na Thiosulfate | 0.20 | — | — | — |
| MgO$_2$*Ester | 0.19 | — | — | — |

The fluid viscosity can be determined by taking the anti-log of the calculated value. The values presented in Table 6 are the coefficients associated to parameter. The Grand Mean is the base line value negating the effect of the important parameters.

The effect of temperature can be determined from the sign and magnitude of the coefficient. The high range of temperature is considered +1 so that +1*−0.43 equals a −0.43 so that at high temperatures, the baseline viscosity 2.11 is reduced by −0.43 to yield 1.68 and the anti-log is 48 cP at 40 sec$^{-1}$. The low temperature is a −1 so that −1*__−0.43 equals +0.43 and is added to the Grand Mean to yield 2.54 or a viscosity of 347 cP at 40 sec$^{-1}$. Each parameter can be evaluated in a likewise manner. The last two effects in Table 6 are referred to as two-parameter interactions and are responsible, in part, for the initial, early time fluid stability. The algebraic product of high levels of MgO$_2$, ester and the coefficient (+1*+1*+0.19) yields 0.19 and is added to the Grand Mean. Also algebraic product of low levels of MgO$_2$, ester and coefficient (−1*−1*0.19) also yields 0.19 and is added to the Grand Mean. This effect shows strong synergy between the alkaline earth peroxide and the ester giving the fluid early enhanced viscosity. Later, the effect diminishes allowing complete degradation of the fluid. A more complete explanation of DOE interpretation can be found in Box, Hunter and Hunter's book. The design also shows that the length of time of high viscosity can also be regulated by manipulating the concentration of the sodium thiosulfate.

As demonstrated above, embodiments of the invention provide a well treatment fluid composition and a method of treating subterranean formations using the composition. A fracturing fluid in accordance with embodiments of the invention is capable of maintaining a relatively high viscosity initially for a sufficient period of time to avoid or minimize premature breaking. After the delayed period is over, the viscosity of the fracturing fluid decreases to a lower level in a relatively short period of time and maintains a lower viscosity for an extended period of time to allow complete or substantially complete breaking of the fracturing fluid. As a result, the fracturing fluid can be removed from the formation and the production of the well may resume. Due to the desirable breaking characteristics of the fracturing fluid, well production may be carried out in an efficient and economic manner. Embodiments of the invention may be carried out without using enzymatic breakers. This would lead to cost savings and less production complexity. Moreover, embodiments of the invention may provide better control of the timing and extent of the breaking of a fracturing fluid. Therefore, process consistency may be obtained. Additional characteristics and advantages provided by embodiments of the invention are apparent to a person skilled in the art.

While the invention has been described with respect to a limited number of embodiments, these embodiments are not intended to limit the scope of the invention as otherwise described and claimed herein. Variations and modification from the described embodiments exist. For example, although it may be economical not to use enzyme breakers in embodiments of the invention, it is entirely acceptable and feasible to combine an enzymatic breaker with an inorganic breaker, along with an ester compound which assists in the degradation of a fracturing fluid so formulated. Similarly, although an inorganic breaking agent is preferred, this does not preclude the use of an organic breaking agent in place of or in addition to an inorganic breaking agent. As described previously, in some embodiments, only esters of polycarboxylic acids are used. This does not preclude use of other types of esters, such as phosphate esters, in other embodiments of the invention where their use is desirable. Moreover, polysaccharides are only one type of hydratable polymers. Any hydratable polymer may be used. In describing the method of treating a subterranean formation, various steps are disclosed. These steps may be practiced in any order or sequence unless otherwise described. Moreover, one or more steps may be combined into one single step. Conversely, one step may be practiced in two or more sub-steps. The appended claims intend to cover all such variations and modifications as falling within the scope of the invention.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention.

What is claimed is:

1. A method of fracturing a subterranean formation, the method comprising:
    obtaining a well treatment fluid comprising a solvent, a polymer which is either soluble or hydratable in the solvent, a crosslinking agent, a breaking agent, and an ester; and
    contacting the well treatment fluid and least a portion of the subterranean formation at pressures sufficient to form fractures in the formation; wherein the ester is acetyl methyl citrate, acetyl ethyl citrate, acetyl propyl citrate, acetyl butyl citrate, or acetyl triethyl citrate.

2. The method of claim 1, wherein the solvent is water.

3. The method of claim 1, wherein the polymer is a galactomannan gum, a glucomannan gum, a guar, a derived guar, cellulose, a cellulose derivative, guar gum, a guar gum derivative, locust bean gum, Karaya gum, carboxymethyl cellulose, carboxymethyl hydroxyethyl cellulose, or hydroxyethyl cellulose.

4. The method of claim 1, wherein the polymer is polyvinyl alcohol, polyacrylamide, or poly-2-amino-2-methyl propane sulfonic acid.

5. The method of claim 1, wherein the crosslinking agent is a boron compound, a titanium compound, a zirconium compound, or mixtures thereof.

6. The method of claim 1, wherein the breaking agent is a percarbonate, a perborate, a peroxide, or a perphosphate.

7. The method of claim 1, wherein the breaking agent is an alkaline earth metal percarbonate, an alkaline earth metal perborate, an alkaline earth metal peroxide, an alkaline earth metal perphosphate, a zinc peroxide, a zinc perphosphate, a zinc perborate, or a zinc percarbonate.

8. The method of claim 1, wherein the breaking agent is calcium peroxide, magnesium peroxide, or zinc peroxide.

9. The method of claim 1, wherein the ester is acetyl methyl citrate, acetyl ethyl citrate, acetyl propyl citrate, or acetyl butyl citrate.

10. The method of claim 1, wherein the ester is acetyl triethyl citrate.

11. A method of fracturing a subterranean formation, the method comprising:
    contacting water or brine with guar gum, hydroxypropyl guar, carboxymethyl guar, carboxymethyl hydroxypropyl guar, or carboxymethyl hydroxyethyl cellulose to form a base gel,
    contacting the base gel with:
        a borate, titanate or zirconium crosslinking agent;
        an alkaline earth peroxide or zinc peroxide; and
        a citric acid ester to form a gelling fluid; and
    contacting the gelling fluid and at least a portion of the subterranean formation at pressures sufficient to form fractures in the formation; wherein the citric acid ester is acetyl methyl citrate, acetyl ethyl citrate, acetyl propyl citrate, acetyl butyl citrate, or acetyl triethyl citrate.

* * * * *